W. B. HYDE.
Rotary Sod-Cutter.
No. 131,401.          Patented Sep. 17, 1872.
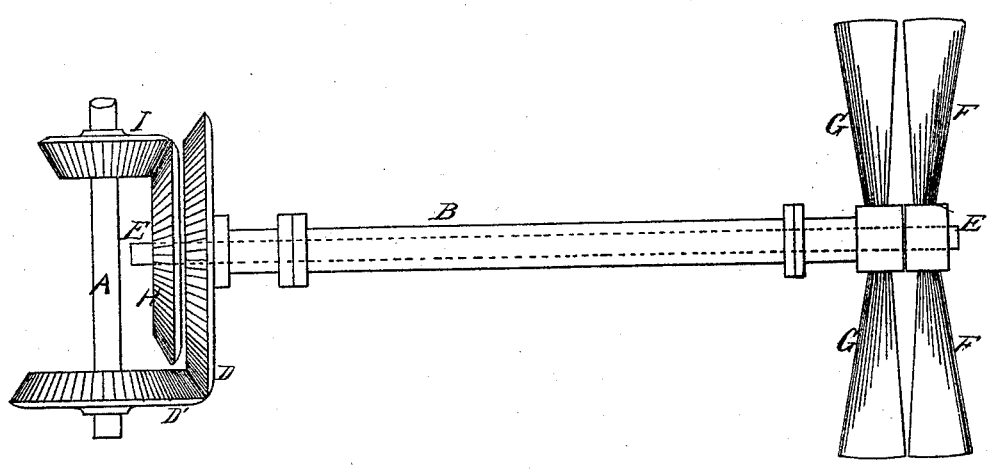
Witnesses.
A. T. Dewey.
J. T. Borne
Inventor.
William B. Hyde
by Dewey & Co.
Attorney

UNITED STATES PATENT OFFICE.

WILLIAM B. HYDE, OF OAKLAND, CALIFORNIA.

IMPROVEMENT IN ROTARY SOD-CUTTERS.

Specification forming part of Letters Patent No. 131,401, dated September 17, 1872.

*To all whom it may concern:*

Be it known that I, WILLIAM B. HYDE, of Oakland, county of Contra Costa, State of California, have invented a Rotary Sod-Cutter; and I do hereby declare the following description and accompanying drawing are sufficient to enable any person skilled in the art or science to which it most nearly appertains to make and use my said invention, without further invention or experiment.

My invention relates to an improved construction and arrangement of the cutters or cultivators which are employed upon steam traction-engines in order to convert them into steam cultivators or plows; and its object is to so construct them that they can be employed in the hardest and toughest sod or soil, and by their peculiar operation either cut or tear it into fragments or small pieces suitable for receiving the seed.

In order to explain my invention so that others skilled in the art will be able to understand the same, reference is had to the accompanying drawing forming a part of this specification, in which the figure shows a side elevation of my invention.

A represents a shaft, which passes transversely across the rear of the machine and which is driven from the main driving-shaft of the engine by suitable means. The shaft B is hollow and carries at its extremity a rotary cutter, G, of that class known as propeller-cutters, being formed of two or more blades, arranged in the form of a screw, so as to cut the sod or soil in slices as it is revolved. At the opposite end of this shaft is a bevel-wheel, D, on the transverse shaft A, and by means of which the shaft B is revolved. Passing through the hollow shaft B is another shaft, E, which also carries at its outer end a rotary cutter, F, constructed in the same manner as G, but provided with an opposite twist, and on its opposite end is a bevel-wheel, H, which engages with the bevel-wheel I on the shaft A, so as to give it an opposite revolution to that given to the shaft B. By this means the two cutters will be given opposite revolutions, so as to cause them to thoroughly pulverize the slices cut off by the forward cutter. This pulverizing will be accomplished by the shearing operation of the blades in revolving in opposite directions, thus permitting the cultivation of tough, matted sod, such as the tule sod of California, which cannot otherwise be properly prepared.

I do not wish to confine myself to any particular style or shape of the cutters employed, nor to the particular device herein enumerated and described for giving to them the opposite revolutions; but What I do claim, and desire to protect by Letters Patent, is—

1. In a sod-cutter, the two rotary cutters G F, revolved, in close proximity to each other and in opposite directions, upon a common center by means of the shaft E and hollow shaft B, in the manner and for the purpose above specified.

2. The hollow shaft B with its rotary cutter G and bevel-wheel D, and the shaft E with its rotary cutter F and bevel-wheel H, in combination with the transverse shaft A carrying the bevel-wheels D' and I, combined and arranged in a rotary sod-cutter, substantially as and for the purpose above described.

In witness whereof I have hereunto set my hand and seal.

WILLIAM B. HYDE. [L. S.]

Witnesses:
J. L. BOONE,
A. T. DEWEY.